United States Patent Office 2,908,259
Patented Oct. 13, 1959

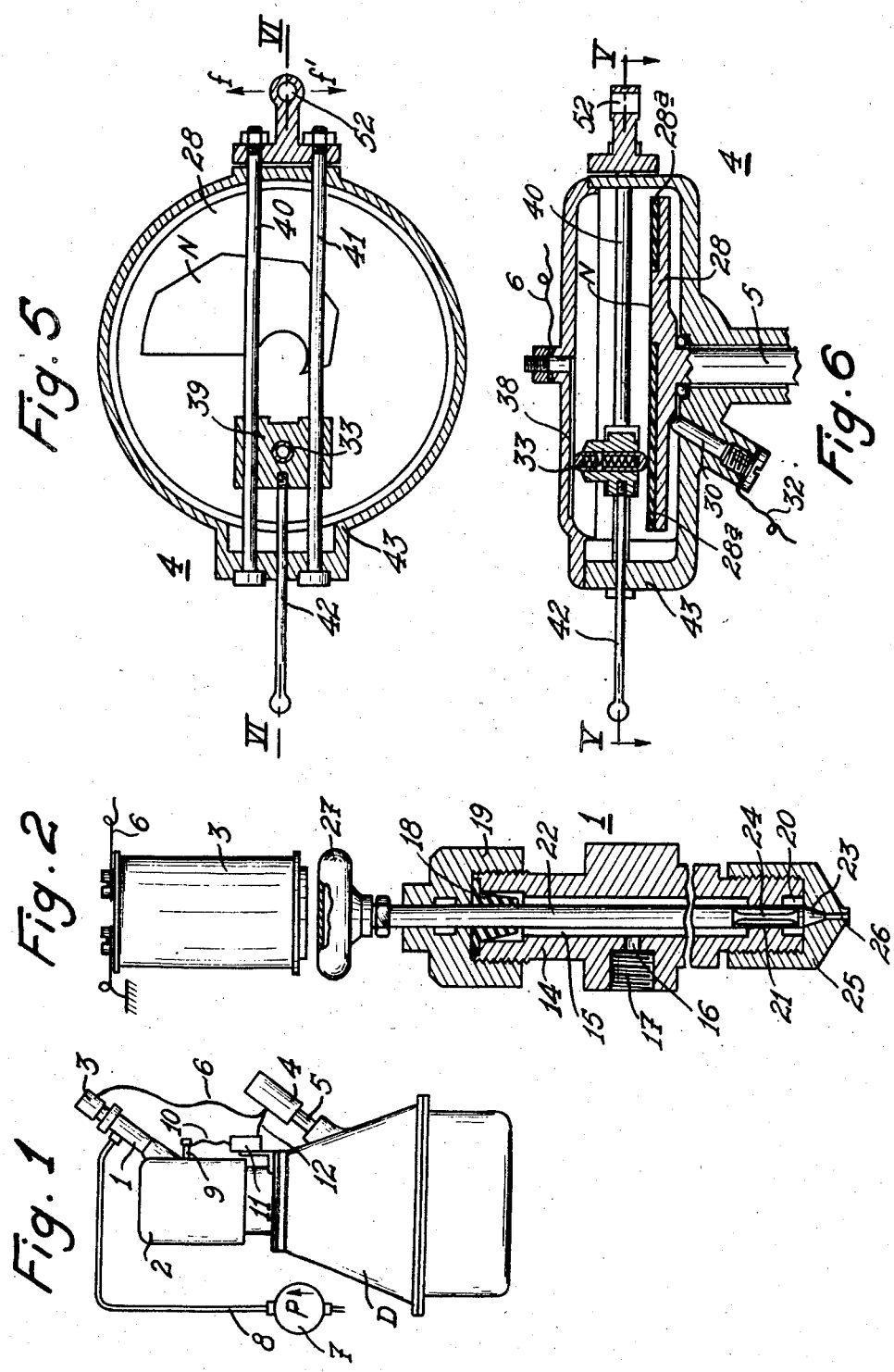

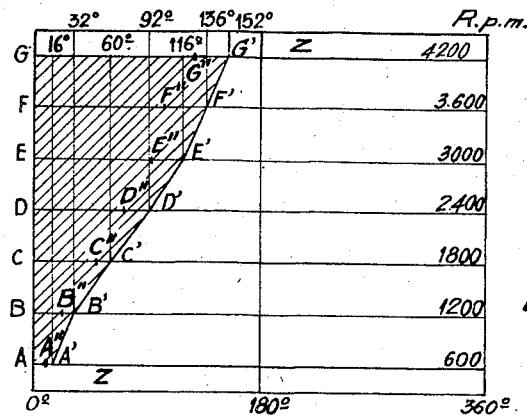
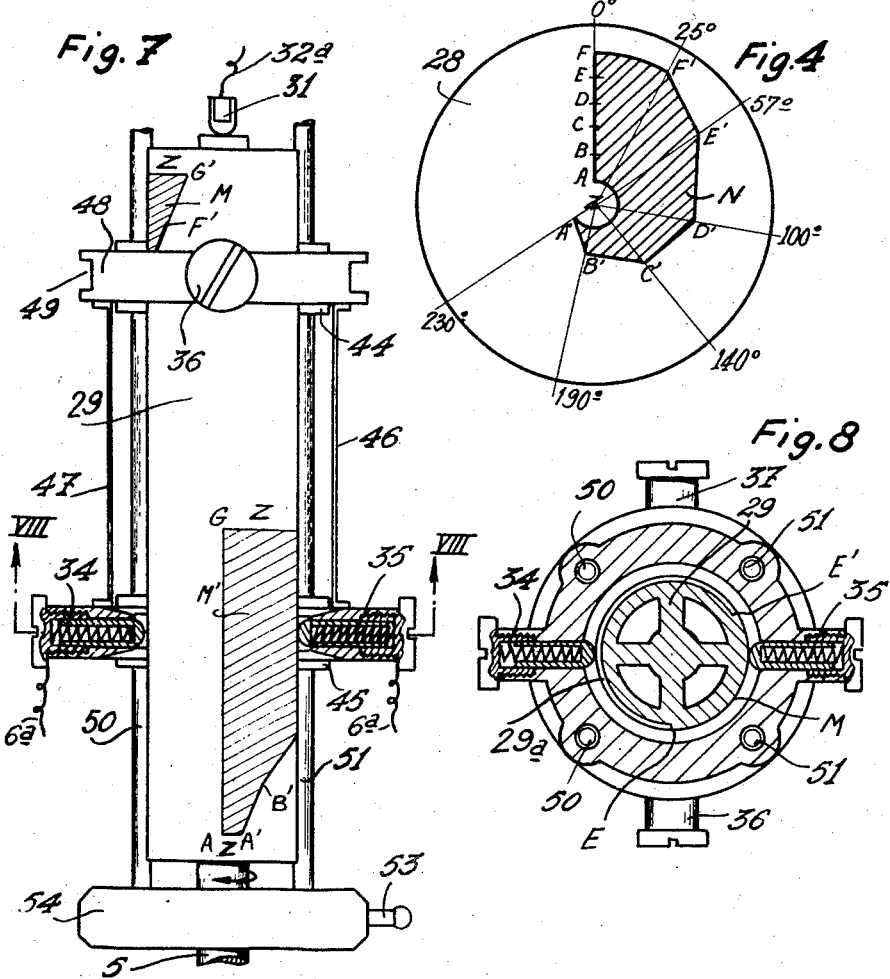

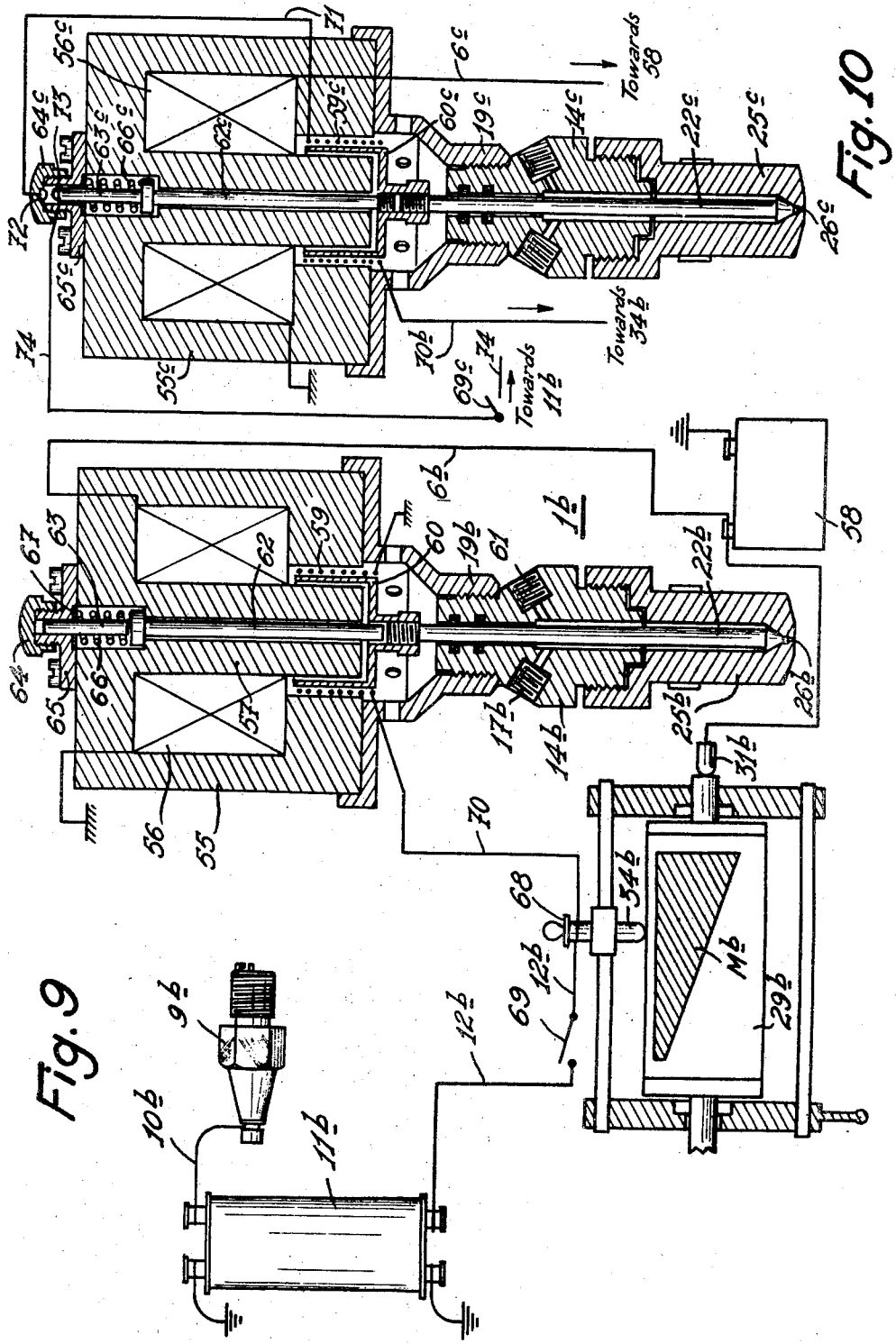

2,908,259

DEVICE FOR INJECTING A FLUID UNDER PRESSURE

Maurice Marie Joseph De Milleville, Munich, Germany

Application February 13, 1956, Serial No. 565,042

Claims priority, application France February 15, 1955

11 Claims. (Cl. 123—32)

The present invention relates to a device for injecting periodically a fluid under pressure, either gaseous or liquid, into a fluid medium, either gaseous or liquid, under pressure or vacuum, more particularly usable for injecting liquid fuel into an internal-combustion engine, for example, a diesel engine or a gasoline engine. For said engines this device is conductive to the improvement of the injection of liquid fuels by providing, on the one hand, a degree of precision both in the volume injected and in the injection timing and, on the other hand, a frequency of injection which cannot be attained with hitherto known fuel injection systems.

Known apparatus for performing such an injection comprises at least one fluid injector of the constant-lift needle-valve type, one per cylinder in the case of an engine, supplied with fluid to be injected under a high constant pressure and controlled by an electromagnet the energization of which is controlled by a body of revolution rotary driven around its revolution axis according to the injection frequencies or to the engine rotary speeds and having a constantly energized electrically conductive area and by at least one current collector bearing and displaceable on said body in a plane passing through its axis of revolution in relation to said injection frequencies or to the engine rotary speeds.

The main object of the present invention is to provide in an apparatus of the above specified character the combination of means for reducing the mechanical inertia of the needle-valve, means for reducing the mechanical and electromagnetic inertia of the electromagnet and means for eliminating the action of the thus reduced inertias on the precision of the injection operation.

According to the present invention, the electromagnet of a given injector is energized for each injection frequency or engine rotary speed during one fraction of the time period existing between successive injections or corresponding to one revolution of the engine between successive injections, which fraction is equal to the ratio existing between, on the one hand, the time during which the constant-lift needle-valve must remain open at said injection frequency or engine rotary speed and to which is added the time necessary for overcoming the inertia resulting from the mechanical and electromagnetic actions of the needle-valve and electromagnet at said injection frequency or engine rotary speed and, on the other hand, said time period, this fraction of the time period permitting the flowing of the metered quantity of fuel which is required at said injection frequency or engine rotary speed.

Preferably the body having an electrically conductive area is rotary driven at such a rotary speed that one turn corresponds to the time period existing between successive injections at the relevant injection frequency or engine rotary speed.

The electromagnet controlling each fluid injector consists either of an electromagnet acting directly on a pole piece rigid with the needle valve of the fluid injector or of a low-inertia electromagnet comprising a central winding surrounding the core concentrically and fed permanently with direct current, and a movable armature consisting of a coil wound in the opposite direction with respect to said central winding and mounted on a light cup-shaped member of non-magnetic material rigid with the end of the needle-valve opposite to the injection orifice and disposed on the central path of the magnetic lines of force of said central winding, this coil being connected to the corresponding current collector of the injection control device, whereby the magnetic field developed through said coil when energized is opposed to the permanent magnetic field developed by said winding, which induces the strong and instantaneous attraction of the cup-shaped member and therefore the lift of the needle-valve and the starting of injection.

Other features and advantages of this invention will appear as the following description proceeds with reference to the attached drawings forming part of this specification and illustrating diagramatically by way of example a few embodiments of the invention. In the drawings:

Figure 1 is a diagrammatical view showing a Diesel engine equipped with an injection apparatus constructed in accordance with the invention.

Figure 2 is an axial section showing the actuation of a constant-lift needle valve injector according to this invention.

Figure 3 is a diagram indicating for predetermined speeds of rotaation of the engine illustrated in Fig. 1 the duration in degrees of the deliveries of current to the electromagnetic circuit for opening the needle valve, 360° corresponding for each rotary speed to the time period between successive injections at said speed.

Figure 4 is a diagrammatical view showing a disc having a conductive surface corresponding to the operative area of a diagram of the type illustrated in Fig. 3 for another internal combustion engine.

Figure 5 is a section taken upon the line V—V of Fig. 6, showing the injection control device utilizing the disc illustrated in Fig. 4.

Figure 6 is a section taken upon the line VI—VI of Fig. 5.

Figure 7 is an elevational view showing the injection control device wherein a distributor cylinder is substituted for the disc of Fig. 4, said cylinder carrying electrically conductive areas reproducing the diagram of Fig. 3.

Figure 8 is a section taken upon the line VIII—VIII of Fig. 7.

Figure 9 is a comprehensive diagrammatical view showing the fuel-injection system of this invention utilizing an electromagnet without pole piece.

Figure 10 shows a modified embodiment of the device illustrated in the right-hand portion of Fig. 9.

The fuel-injection apparatus constructed in accordance with the teachings of this invention and illustrated in a specific form of embodiment in Fig. 1 of the drawings comprises a set of fuel-injectors 1 mounted in the cylinder-head 2 of an internal-combustion engine, for example a compression-ignition diesel engine D. The needle-valves of these injectors are of the constant-lift type and adapted to be actuated by electromagnets 3 connected to the ground (in this case the engine) and fed through an intermittent-contact distributor 4 mounted on an engine-driven timing shaft 5 and connected through conductors 6 to these electromagnets 3, as shown. The injectors 1 are supplied under constant flow per time unit from a suitable pump 7 through a pipe 8 with liquid fuel under a relatively high constant pressure which is higher than the maximum pressure existing in the engine cylinders. This pump 7 is driven either from the engine D or from a separate power supply, no synchronization being required between its operating cycle and that of the fuel injectors 1. On the other hand to permit the cold starting the cylinders of the engine D are provided with ignition spark plugs 9 connected through wires 10 to the secondaries of high-voltage coils 11 having their primaries connected through conductors 12 to the aforesaid distributor 4.

Each injector 1, as shown in Fig. 2, comprises a body 14 having an inner chamber 15 communicating through an orifice 16 and a tapped hole 17 with the feed pipe 8 of Fig. 1. This chamber 15 is closed at its upper end by a tapered joint 18 of fuel-resisting material; this joint is clamped in position by a nut 19 engaging the threaded upper end of the body 14, as shown. The chamber 15 is separated from a smaller lower extension 20 by a narrower guiding portion 21. A needle valve 22 is slidably mounted through the central apertures of the nut 19 and chambers 15, 20; this needle valve is formed with a pointed end 23 and has longitudinal fins or ribs 24 formed along one portion of its rod or stem for guiding the needle valve in the portion 21 while providing a permanent passage between the chambers 15 and 20. Thus, the inlet current of fuel arriving by way of hole 17 and filling the annular space of chamber 15 defined between the needle-valve 22 and the body 14 does not tend to urge back said needle-valve when opened, thereby reducing its inertia effect. The lower end of the body 14 has screwed thereon a cap-shaped member 25 constituting the nozzle proper and having formed therein the injection orifice 26 and a conical adapted to be engaged by the lower seat end 23 of the needle valve. The needle valve 22 carries at its upper end an armature-forming member 27 adapted to be attracted by the electromagnet 3 for controlling the needle valve directly. The needle valve may be seated by the fuel pressure or, when a balanced valve is used, by an external spring.

The distributor 4 is constructed by firstly drafting a very accurate diagram of the time during which current should be fed to the electromagnet for a predetermined range of engine speed, for example between 600 and 4,200 r.p.m., due allowance being made for the inherent inertia of this electromagnet, so that the injector will deliver exactly the desired fuel quantities in accordance with the required engine power or with the load imposed to the engine at the speeds contemplated. All the time periods thus determined are converted into degrees of a circumference assumed to be rotated at such a velocity that one turn corresponds to the time period existing between injections at said speeds respectively, and as a result the definitive diagram graduated in degrees and shown in Fig. 4 is obtained. This diagram is reproduced with a high accuracy on the distributor 4 comprising a suitably shaped rotary body of revolution of electrically conductive material such as the area M on the cylinder 29 of Figs. 7 and 8. The area N of disc 28 (Figs. 4 to 6) reproduces the energizing diagram of the electromagnet for another internal-combustion engine. Other shapes of bodies of revolution such as part-spherical members, etc. may be used be used to this end, the conductive member being fed continuously with electric current through a brush 30 (Fig. 6) or 31 (Fig. 7), connected in turn through a conductor 32 or 32a with a suitable source of current. This conductive body of revolution is driven from the shaft 5 driven in turn from the engine D.

The surface of revolution of this rotary conductive member is so designed that the conductive material remains apparent or flush only on the surface of the reproduced diagram, the remaining portion of this surface being accurately covered with a suitable insulating material 28a (Fig. 6) or 29a (Fig. 8), by using any adequate method to this end.

A suitable current collector, consisting for example of a brush 33 (Figs. 5, 6), or brushes 34, 35, 36, 37 (Figs. 7, 8)—although a roller may be substituted therefor is constantly urged against this surface of revolution so that current will flow through this collector as the surface rotates but only when the collector engages the conductive area reproducing the injection diagram as already explained hereinabove. The brush 33 bears on a conductive surface 38 connected through the conductor 6 to the electromagnet. The brushes 34 to 36 are connected through conductors 6a to the electromagnets.

The velocity of rotation of the body of revolution is determined as in the case of known automotive ignition distributors as a function of the engine type (two- or four-stroke engine) and of the number of cylinders. The direction of rotation must be such that the current collector will pass from the insulated surface to the diagram area at the abscissa corresponding to 0°, shown at AG in the diagram of Fig. 3 and at AF in the diagram of Fig. 4, the timing being so adjusted that the collector brush lies on this abscissa, for example 0°, when the piston is at the top dead centre and the engine stopped.

When the longest abscissa corresponds to less than 180° (G—G′, Fig. 3) it is possible to locate another collector-brush spaced 180° from the former in the specific case of a four-cylindered engine, so that this other collector will contact the same diagram; however, if this longest abscissa exceeds 180° (AA′, Fig. 4) only one collector per diagram can be used.

As illustrated in Fig. 7 the rotary cylinder may be extended to form two or more diagrams M, M′ thereon, according to the number of cylinders of the engine said diagrams being offset with respect to one another parallel to the cylinder axis at a distance at least equal to their height and angularly at an angle related to the number of cylinders.

The support 39 of the brush 33 is slidably mounted on a pair of rods 40, 41 and adapted to be moved therealong by means of a stem 42 (Figs. 5 and 6). These rods 40, 41 are rigidly connected to the casing 43 pivotally mounted around the disc 28. The members 44 and 45 carrying the brushes 34 to 37 of the embodiment shown in Figs. 7 and 8 are interconnected through distance members 46, 47 and secured to a control member 48 actuated by means of a fork (not shown) engaging the groove 49 of this member slidably mounted on a pair of guiding rods 50, 51.

With this arrangement the brush or brushes may be brought to the desired location between the extreme abscissae, or even in the zone Z just outside the diagram. In this last-mentioned zone Z the brush or brushes do not receive any current and the engine may thus continue to rotate without receiving any injected fuel.

This particular feature is important in that it permits the cold starting of a diesel engine without using heating plugs. As will be described hereafter with reference to Fig. 9, in this case a branch connection is provided from the distributor for feeding energizing current to a high-voltage coil having its secondary connected to a conventional ignition spark plug when the intermittent contact provided by the brush or brushes engaged by the rotating conductive diagram is broken. To start the engine, the brush or brushes are held on the zone Z just outside or adjacent to the diagram; then the engine is driven a few revolutions by means of the starter motor so that during these revolutions the cylinder heads are heated by the full-compression conditions thus established in the absence of any injected fuel. Then, the aforesaid branch connection is coupled to the circuit and at the same time the brush or brushes are placed in their operative positions. Upon breaking the contact the secondary current generated in the coil is transformed into a spark between the sparking plug electrodes within the combustion chamber. Thus, the engine will be started immediately and the branch connection disconnected, except engines of the type utilizing gas-oil under low pressure and an ignition system comprising spark-plugs and a current distributor, such as the engines known under the trade name "Penta-Hesselman." Moreover, this zone Z permits of utilizing the vehicle engine as a brake without any fuel injection, thereby suppressing any risk of introducing even very small quantities of unburnt liquid fuel into the engine cylinders.

The displacement of the brush or brushes takes place in a direction parallel to one of the generating lines of the surface of revolution, irrespective of the shape given to the rotary conductive member.

On the other hand, as the time-lags due to the inertia in the operation of the electromagnetic circuit (which are designated by the lines AA" to GG" in the diagram of Fig. 3) have been included in the calculation of this diagram, the injector would not be actuated just as the brush passes through the abscissa corresponding to 0°, i.e. through A to G, but only later on at A" to G", after having travelled through the arc corresponding to the time lag imposed by the inertia of operation of the electromagnet, which arc is calculated as a function of the arc of 360° representing the time period between successive injections at the speed concerned.

As the value of this arc is known, the complete brush-carrying casing is pivoted angularly as in conventional spark-ignition distributors by either displacing the casing 43 about the disc 28, by using to this end the extension 52 movable in the direction of the arrows f or f' (Figs. 5, 6) or moving the lever 53 carried by the member 54 rigid with the brush-carrier (Fig. 7), so that the brush or brushes will engage the diagram with the number of degrees in advance in correspondence to the corresponding line AA" to GG" of the diagram at the speed concerned. Thus, the effects of the mechanical and electromagnetic inertia will be rendered null since the brush is positioned on the ordinate of this speed so that the needle valve of the injector is lifted when this brush engages the 0-degree abscissa corresponding to the position of the piston at the top-dead-center. If an additional advance is desired it will be sufficient to increase proportionally the number of advance degrees by acting upon the control member 52 (Figs. 5, 6) or 53, 54 (Fig. 7).

The output of the fuel feeds by pump 7 as well as the pressure to which said fuel is submitted being constant, on the one hand, while, on the other hand, the needle-valve has a constant lift which defines a constant-section passage through injector 1, the quantity of fuel flowing through said injector 1 during each injection period designated by the lines A", A to G", G in the diagram of Fig. 3 is therefore submitted to a metering action.

The inertia in the operation of the electromagnetic circuit is further reduced considerably by incorporating in the fuel-injection apparatus the electromagnet illustrated in Figs. 9 and 10 of the drawings. This electromagnet 55 comprises a central winding 56 surrounding a hollow central core 57 fed permanently with direct current from a source 58 and wherein the conventional pole piece is dispensed with. This pole piece is replaced by a coil 59 wound on a light cup-shaped member 60 of non-magnetic material secured on the end of the needle-valve 22b opposite to the injection orifice 26b and disposed on the central path of the magnetic lines of force of said central winding 56.

This injector differs from the injector 1 of Fig. 2 in that its body 14b comprises in addition to the feed connector 17b an air-vent connector 61, and that the nut 19b is formed integrally on the member carrying the electromagnet 55. The other like parts are designated by the same reference numerals but followed by the letter b. The needle valve 22b engages a loosely mounted rod 62 acting in turn on a pin 63 whereby the stroke of the needle valve 22b may be adjusted through a nut 64 engaging a threaded member 65 secured on the electromagnet 55. A spring 66 adapted to be loaded more or less by means of washers 67 urges the needle valve 22b on its seating. Thus, the holding spring 66 may be pre-loaded and the stroke of the needle valve 22b adjusted without disassembling this valve.

The coil 59 is fed with current at the desired moment and for the proper duration through a conductor 70 connected to the intermittent contactor constituted by the brush 34b, the rotary cylinder 29b carrying the conductive reproduction $M_b$ of the diagram and the feed brush 31b connected to one terminal of the battery 58. The winding of coil 59 which surrounds the cup-shaped member 60 and the electromagnet winding 56 are so disposed that the magnetic fields developed to the actions of the currents flowing therethrough are opposed to each other, which induces, when said coil is energized, the strong and instantaneous attraction of the cup-shaped member 60 and therefore the lift of the needle-valve 22b and the starting of injection. Except for the electromagnet 55 all the other parts are made of non-magnetic materials or metals.

A branch circuit 12b leading to the primary winding of a high-tension coil 11b the secondary winding of which feeds a sparking plug 9b conveniently placed within the cylinder through the conductor 10b may be connected from the terminal 68. Said branch circuit is closed by a switch 69 for starting the engine from cold, as already stated.

This cold starting of the engine may be obtained by resorting to the device illustrated in Fig. 10 wherein the same parts as those shown in Fig. 9 are designated by the same reference numerals followed by the letter c. In this case the winding 59c connected to the brush 34b is also connected through a conductor 71 to a platinum or, more commonly, tungsten metal point 72 carried by the nut 64c and co-acting with another metal point 73 carried by the adjustment pin 63c which, in this case, will form an integral part of the abutment rod 62c screwed in the lower portion of the cup-shaped member 60c. A conductor 74 connects directly the metal point 73 to the switch 69c which, in this case, is not connected to the terminal 68.

In the case of a gasoline engine, the branch circuit 12b or 74 is permanently closed by the switch 69 or 69c in order to obtain the ignition of the engine said switch may also be dispensed with.

The attached drawings give various constructional details by way of example; thus, the rotary conductive member, instead of being of cylindrical or disc shape, may consist of a semi-spherical member carrying one or more brushes on its concave surface or on its convex surface, or of a hollow cylinder with the brush or brushes disposed on its inner surface.

The intermittent-contactor system described hereinabove is characterized by a considerable flexibility of adjustment for it is obviously quite possible to extend the diagram by moving the extreme abscissae away from each other; on the other hand, the precision of this arrangement is absolute since the effect of inertia, which is so detrimental in all the hitherto known fuel injection systems as the engine speed increases, is counterbalanced completely by the angular displacement of the collector brush or brushes which permits the opening of the needle valve at exactly the proper time as calculated in establishing the injection diagram, so that the latter will be accomplished within the combustion chamber.

Of course, many details may be modified in carrying out the present invention without departing from the scope thereof as defined in the appended claims.

While the drawings given by way of example relate to the injection of liquid fuel into an internal-combustion engine, the method specified and the device described and illustrated may be used in all cases where an accurate volume of a fluid under constant pressure, either gaseous or liquid, must be injected at a controlled frequency as high as required into a fluid medium, either gaseous or liquid, under pressure or vacuum, for performing, for example, the production of gaseous beverages such as gaseous water by injection of carbon dioxide into water, whereby a single injection controlling device may equip filling machines having various productions per hour or a filling machine the production per hour of which may be varied.

What I claim is:

1. In an apparatus for injecting, with a constant flow per time unit, a fluid under constant pressure into a fluid medium under pressure, such as liquid fuel into internal-combustion engines, and of the kind comprising at least one fluid injector of the constant-lift needle-valve type, one per cylinder in the case of an engine, supplied with fluid to be injected under a high constant pressure and controlled by an electromagnet the energization of which is controlled by a body of revolution rotary driven around its revolution axis according to the injection frequencies and having a constantly energized electrically conductive area and by at least one current collector bearing and displaceable on said body in a plane passing through its axis of revolution in relation to said injection frequencies and connected to said electromagnet; the improvement which comprises means for decreasing the mechanical inertia of the needle-valve, means for decreasing the mechanical and electromagnetic inertia of the electromagnet and means for controlling the electromagnet energization, at each injection frequency, during a time period equal to the time period necessary for overcoming the thus reduced inertias and to which is added the time period necessary for injecting in the medium the required amount of injected fluid, in order to eliminate the action of said inertias on the precision of the injection operation.

2. An apparatus according to claim 1, wherein the means for decreasing the mechanical inertia of the needle-valve comprises an injector body independent from the electromagnet and formed with a chamber fed with fluid to be injected whereby the dimensions of said chamber may be reduced at their minimum possible values, and a needle-valve reciprocally movable within said chamber and the configuration of which is determined so that any movement of said value generates in said chamber no injected fluid pressure tending to hamper said movement, whereby said valve has a relatively low inertia effect.

3. An apparatus according to claim 1, wherein the means for decreasing the mechanical and electromagnetic inertia of the electromagnet comprises a low-inertia electromagnet having a central stationary core, a coil wound on said core, a light non-magnetic cup-shaped member secured on the end of the needle-valve opposite to the injection orifice of the relevant fluid injector and disposed on the central path of the magnetic lines of force of said coil, and a winding formed around the outer surface of said cup-shaped member, a source of current permanently connected to said coil and to the electrically conductive area, and a connection between said winding and the relevant current collector, said coil and winding being so disposed that the magnetic fields developed by the actions of the currents flowing therethrough are opposed to each other, whereby the energization of said winding induces the instantaneous attraction of said cup-shaped member and therefore the lift of the needle-valve and the starting of injection.

4. An apparatus according to claim 1, usable for an internal-combustion engine, further comprising an axial pin slidably mounted in a hole formed through the core and adapted to engage the needle-valve, a spring mounted in a cavity formed in said core and slidably engaged by said axial pin, said spring urging said pin against said needle-valve to move the latter to its closed position, a blind nut screwed on said core for adjusting the stroke of this axial pin and therefore the constant lift of said needle-valve, a pair of metal points registering with each other and secured on the inner face of the blind nut and on the end surface of the axial pin, respectively, the winding being connected through one end to the relevant collector and through its other end to one of said metal points, a spark plug mounted in the relevant cylinder, a high-tension coil having a secondary connected to said spark plug, a conductor connecting the other metal point to the primary of said high-tension coil, and a switch inserted in this conductor.

5. An apparatus according to claim 1, wherein the body of revolution having an electrically conductive area is rotary driven at such a rotary speed that one turn corresponds to the time period existing between successive injections at the relevant injection frequency.

6. An apparatus according to claim 5, wherein the body of revolution consists of a disc.

7. An apparatus according to claim 5, wherein the means for eliminating the action of the inertias on the precision of the injection operation comprises on the body of revolution an electrically conductive area the configuration of which is determined so that, for each injection frequency, each current collector travels over said area through an arc comprising a first arc corresponding to the time-lag imposed at said injection frequency by the mechanical and electromagnetic inertia effects of the needle-valve and electromagnet and a second arc extending said first arc and corresponding to the time during which the needle-valve must remain opened for injecting the required amount of injected fluid in the medium at said injection frequency, and a current-collector carrying casing displaceable around the axis of revolution of the body of revolution.

8. An apparatus according to claim 7, including more than one current collector, wherein the rotary body carries a plurality of similar electrically conductive areas offset with respect to one another parallel to the revolution axis of said body at a distance at least equal to their height and angularly at an angle related to the number of current collectors.

9. An apparatus according to claim 1, usable for injecting fuel in an internal-combustion engine, further comprising a spark plug mounted in each cylinder of the engine, a high-tension coil having its secondary connected to said spark plug, a conductor connecting the relevant current-collector to the primary of said high-tension coil, and a switch inserted in said conductor and adapted to close the relevant circuit.

10. In an apparatus for injecting, with a constant flow per time unit, a fluid under constant pressure into a fluid medium under pressure, such as liquid fuel into internal-combustion engines, and of the kind comprising at least one fluid injector of the constant-lift needle-valve type, one per cylinder in the case of an engine, supplied with fluid to be injected under a high constant pressure and controlled by an electromagnet the energization of which is controlled by a body of revolution rotary driven around its revolution axis according to the injection frequencies and having a constantly energized electrically conductive area and by at least one current collector bearing and displaceable on said body in a plane passing through its axis of revolution in relation to said injection frequencies and connected to said electromagnet; the improvement which comprises an injector body independent from the electromagnet and formed with a chamber fed with fluid to be injected whereby the dimensions of said chamber may be reduced at their minimum possible values, and a needle-valve reciprocally movable within said chamber and the configuration of which is determined so that any movement of said valve generates in said chamber no injected fluid pressure tending to hamper said movement; a low-inertia electromagnet having a central stationary core, a coil wound on said core, a light non-magnetic cup-shaped member secured on the end of the needle-valve opposite to the injection orifice of the relevant fluid injector and disposed on the central path of the magnetic lines of force of said coil, and a winding formed around the outer surface of said cup-shaped member, a source of current permanently connected to said coil and to the electrically conductive area, and a connection between said winding and the relevant current collector, said coil and winding being so disposed that the magnetic fields developed by the actions of the currents flowing therethrough are opposed to each other, whereby the energization of said winding induces the instantaneous attraction of said cup-shaped member and therefore the lift of the needle-valve and the starting of injection; and on the body of revolution rotary driven at such a rotary speed that one turn corresponds to the time period existing between successive injections at the relevant injection frequency, an electrically conductive area the configuration of which is determined so that, for each injection frequency, each current collector travels over said area through an arc comprising a first arc corresponding to the time-lag imposed at said injection frequency by the mechanical and electromagnetic inertia effects of the needle-valve and electromagnet and a second arc extending said first arc and corresponding to the time during which the needle-valve must remain opened for injecting the required amount of injected fluid in the medium at said injection frequency, and a current-collector carrying casing displaceable around the axis of revolution of the body of revolution.

11. In an apparatus for injecting, with a constant flow per time unit, a fluid under constant pressure into a fluid medium under pressure, such as liquid fuel into internal combustion engines, and of the kind comprising at least one fluid injector of the constant-lift needle-valve type, one per cylinder in the case of an engine, supplied with fluid to be injected under a high constant pressure and controlled by an electromagnet the energization of which is controlled by a body of revolution rotary driven around its revolution axis according to the injection frequencies and having a constantly energized electrically conductive area and by at least one current collector bearing and displaceable on said body in a plane passing through its axis of revolution in relation to said injection frequencies and connected to said electromagnet; the improvement which comprises an injector body independent from the electromagnet and formed with a chamber fed with fluid to be injected whereby the dimensions of said chamber may be reduced at their minimum possible values, and a needle-valve reciprocally movable within said chamber and the configuration of which is determined so that any movement of said valve generates in said chamber no injected fluid pressure tending to hamper said movement; a low-inertia electromagnet having a central stationary core, a coil wound on said core, a light nonmagnetic cup-shaped member secured on the end of the needle-valve opposite to the injection orifice of the relevant fluid injector and disposed on the central path of the magnetic lines of force of said coil, and a winding formed around the outer surface of said cup-shaped member, a source of current permanently connected to said coil and to the electrically conductive area, and a connection between said winding and the relevant current collector, said coil and winding being so disposed that the magnetic fields developed by the actions of the currents therethrough are opposed to each other whereby the energization of said winding induces the instantaneous attraction of said cup-shaped member and therefore the lift of the needle-valve and the starting of injection; and a disc rotary driven at such a rotary speed that one turn corresponds to the time period existing between successive injections at the relevant injection frequency, one face of said disc being provided with an electrically conductive area the configuration of which is determined so that, for each injection frequency, each current collector travels over said area through an arc comprising a first arc corresponding to the time-lag imposed at said injection frequency by the mechanical and electromagnetic inertia effects of the needle-valve and electromagnet and a second arc extending said first arc and corresponding to the time during which the needle-valve must remain opened for injecting the required amount of injected fluid in the medium at said injection frequency, and a current-collector carrying casing displaceable around the axis of revolution of said disc.

References Cited in the file of this patent

UNITED STATES PATENTS

| | | |
|---|---|---|
| 1,288,439 | Pattinson | Dec. 17, 1918 |
| 1,627,727 | Charter | May 10, 1927 |
| 1,679,159 | French | July 31, 1928 |
| 2,332,909 | Fuscaldo | Oct. 26, 1943 |